United States Patent [19]
Farris

[11] Patent Number: 5,805,997
[45] Date of Patent: Sep. 8, 1998

[54] SYSTEM FOR SENDING CONTROL SIGNALS FROM A SUBSCRIBER STATION TO A NETWORK CONTROLLER USING CELLULAR DIGITAL PACKET DATA (CDPD) COMMUNICATION

[75] Inventor: Robert D. Farris, Sterling, Va.

[73] Assignee: Bell Atlantic Network Services, Inc., Arlington, Va.

[21] Appl. No.: 592,441

[22] Filed: Jan. 26, 1996

[51] Int. Cl.[6] .............................. H04Q 7/20; H04Q 7/22
[52] U.S. Cl. ........................ 455/461; 455/466; 379/207
[58] Field of Search .................................. 455/466, 560, 455/561, 428, 461

[56] References Cited

U.S. PATENT DOCUMENTS

| | | |
|---|---|---|
| 4,191,860 | 3/1980 | Weber . |
| 4,313,035 | 1/1982 | Jordan et al. . |
| 4,611,094 | 9/1986 | Asmuth et al. . |
| 4,611,096 | 9/1986 | Asmuth et al. . |
| 4,756,020 | 7/1988 | Fodale . |
| 4,757,267 | 7/1988 | Riskin . |
| 4,788,718 | 11/1988 | McNabb et al. . |
| 4,899,373 | 2/1990 | Lee et al. . |
| 5,247,571 | 9/1993 | Kay et al. . |
| 5,353,331 | 10/1994 | Emery et al. . |
| 5,418,844 | 5/1995 | Morrissey et al. . |
| 5,533,019 | 7/1996 | Jayapalan ................................. 370/352 |
| 5,544,222 | 8/1996 | Robinson et al. ....................... 455/557 |
| 5,610,972 | 3/1997 | Emery et al. ............................ 455/414 |

*Primary Examiner*—Dwayne D. Bost
*Assistant Examiner*—Linwood C. Scott, Jr.
*Attorney, Agent, or Firm*—McDermott, Will & Emery

[57] ABSTRACT

A combined landline Advanced Intelligent Network (AIN) and Cellular Digital Packet Data (CDPD) system provides the capability of call feature selection using control signals generated by a mobile subscriber. The calling features are specified by the control signals which are sent within the CDPD system from the subscriber station to a CDPD controller or switching entity. Protocol translation takes place so that the control signals from the subscriber station are placed in a form suitable for the CCIS normally used in an AIN. These signals are transferred to convenient AIN switching or control entity and sent to an ISCP where the request for calling features are evaluated and instructions given to other elements of the AIN to provide the requested calling features.

17 Claims, 7 Drawing Sheets

SYSTEM FOR SENDING CONTROL SIGNALS FROM A SUBSCRIBER STATION TO A NETWORK CONTROLLER USING CELLULAR DIGITAL PACKET DATA (CDPD) COMMUNICATION

TECHNICAL FIELD

The present invention relates to the use of an Advanced Intelligent Network (AIN) and techniques for providing control signals throughout such a network. In particular, the present invention effectively interfaces control signal systems for both AIN landline networks and wireless communication systems.

Acronyms

The written description uses a large number of acronyms to refer to various services and system components. Although known, use of several of these acronyms is not strictly standardized in the art. For purposes of this discussion, acronyms therefore will be defined as follows:

Action Control Point (ACP)
Advanced Intelligent Network (AIN)
Advanced Services Platform (ASP)
Authentication Center (AC)
Automatic Number Identification (ANI)
Base Station (BS)
Cellular Digital Packet Data (CDPD)
alling Party Pays (CPP)
Cellular Geographical Serving Area (CGSA)
Cellular Subscriber Station (CSS)
Common Channel Inter-office Signalling (CCIS)
Connectionless Network Services (CLNS)
Dual Tone Multifrequency (DTMF)
Data and Reporting System (D&RS)
Equipment Identity Register (EIR)
Home Location Register (HLR)
Integrated Service Control Point (ISCP)
Intelligent Peripheral (IP)
Line Information Data Base (LIDB)
Local Access and Transport Area (LATA)
Local Exchange Routing Guide (LERG)
Low-Power Self Contained Cell (LPSC)
Mobile Identification Number (MIN)
Mobility Controller (MC)
Mobile Data Base Station (MDBS)
Mobile Data Intermediate System (MD-IS)
Mobile End User Station (M-ES)
Mobile Identification Number (MIN)
Mobile Network Location Protocol (MNLP)
Mobile Switching Center (MSC)
Mobile Telephone Switching Office (MTSO)
Network Control System (NCS)
Network Management System (NMS)
Overhead Message Train (OMT)
Packet Assembler/Disassembler (PAD)
Personal Base Station (PBS)
Personal Communication Service (PCS)
Plain Old Telephone Service (POTS)
Private Branch Exchange (PBX)
Private Automatic Branch Exchange (PABX)
Public Switched Telephone Network (PSTN)
Registration Notification (Regnot)
Registration Cancellation (Regcanc)
Service Control Point (SCP)
Service Management System (SMS)
Service Switching Point (SSP)
Signalling Transfer Point (STP)
Standard Metropolitan Statistical Area (SMSA)
Station Message Detail Recording (SMDR)
Service Creation Environment (SCE)
Telephone Company (TELCO)
Temporary Local Directory Number (TLDN)
Transaction Capabilities Applications Protocol (TCAP)
Very Important Person (VIP)
Visitor Location Register (VLR)
Wireless Private Branch Exchange (WPBX)

BACKGROUND ART

The Advanced Intelligent Network (AIN) provides centralized control of telephone services provided to subscribers through diversely located central office switching systems. In an AIN type system, central offices send and receive data messages from an Intelligent Services Control Point (ISCP) via a Switching Transfer Point (STP). At least some calls are then controlled through multiple central office switches using data retrieved from a data base in the ISCP. In recent years, a number of new service features have been provided by the Advanced Intelligent Network (AIN). U.S. Pat. No. 5,247,571 to Kay et al. discloses an AIN used to provide Area Wide Centrex service. This Patent is incorporated herein by reference and operates as follows.

FIG. 1 is a schematic block diagram of the components of an AIN system. In this Figure, each of the CO's are labeled as Service Switching Points (SSP). The SSP, are appropriately equipped programmable switches present in the telephone network, which recognize AIN type calls, launch queries to the Integrated Service Control Point (ISCP) and receive commands and data from the ISCP to further process the AIN calls.

SSP's can be programmed to recognize a number of different triggers as an indication that a call is an AIN call. The trigger can relate to the terminating station, but in Area Wide Centrex the trigger is typically the identification of the telephone line from which a call or other request for service originates. Generally, for Area Wide Centrex, a number of lines are designated as members of a business group serviced by the Area Wide Centrex. The SSP's then trigger AIN type services based on the origination of the call or service request from a line designated as a member of one of the groups subscribing to Area Wide Centrex.

Such central office switching systems typically consist of a programmable digital switches connected by a Common Channel Inter-office Signalling (CCIS) system. One example of such a switch is a 5ESS type switch manufactured by AT&T; but other vendors, such as Northern Telecom and Seimens, manufacture comparable digital switches which could serve as the SSP's. The illustrated embodiment is perhaps an ideal implementation which would make Area Wide Centrex widely available at the local office level throughout the network. Other implementations provide the SSP functionality only at selected points in the network, and end offices without such functionality forward calls to one of the SSP's.

The SSP's 11 and 13 connect to a first local area STP 23, and the SSP's 15 and 17 connect to a second local area STP 25. The connections to the STP's are for signalling purposes. As indicated by the black dots below STP's 23 and 25, each local area STP can connect to a large number of the SSP's. In FIG. 1, the central offices or SSP's are interconnected to each other by trunk circuits for carrying telephone services.

The local area STP's 23 and 25, and any number of other such local area STP's shown as black dots between STP's 23 and 25 communicate with a state or regional STP 31. The state or regional STP 31 in turn provides communications with the ISCP 40. The STP hierarchy can be expanded or contracted to as many levels as needed to serve any size area covered by the Area Wide Centrex and to service any number of stations and central office switches. The links 23 and 25 between the CO's and the local area STP's are dedicated CCIS links, typically SS#7 type interoffice data communication channels. The local area STP's are in turn connected to each other and to the regional STP 31 via a packet switched network. The regional STP 31 also communicates with the ISCP 40 via a packet switched network.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. Of particular note here, an initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example, a format for a subsequent query from the SSP, and formats for "INVOKE" responses for instructing the SSP to play an announcement or to play an announcement as collect digits.

The ISCP 40 is an integrated system. Among other system components, the ISCP 40 includes a Service Management System (SMS) 41, a Data and Reporting System (D&RS) 45 and the actual data base or Service Control Point (SCP) 43. The ISCP also typically includes a terminal subsystem referred to as a Service Creation Environment (SCE) for programming the data base in the SCP 43 for the services subscribed to by each individual business customer.

Each central office switching system normally responds to a service request on a local communication line connected thereto to selectively connect the requesting line to another selected local communication line. The connection can be made locally through only the connected central office switching system. For example, for a call from station A to station B the SSP 11 provides the call connection without any connection to another central office. When the called line connects to a distant station, for example, when station A calls station C, the connection is made through the connected central office switching system SSP 11 and at least one other central office switching system SSP 13 through the telephone trunks interconnecting the two CO's.

A number of the features provided by the prior art AIN type intelligent networks relate to specialized call processing of incoming calls, as discussed below.

U.S. Pat. No. 4,756,020 issued Jul. 5, 1988, to Fodale, for example, suggests access authorization in a multiple office environment. The Fodale system restricts access to a long distance telephone network based on the status of the billing number associated with the call, i.e. delinquent. The access control is provided through multiple local and toll offices but is centrally controlled by a data base which stores account status information. The local office serving a calling telephone extends a toll call to the toll office of the toll network carrier. The toll office queries the data base via a CCIS link regarding the current status of the customer's account identified by the billing number associated with the call. The data base obtains the status information of the billing number in question and translates that status into a response message instruction to allow or disallow extension of the toll call through the toll network. The data base transmits the response message to the toll office via CCIS link, and the toll office disallows or extends the call through the toll network as instructed by the response message.

U.S. Pat. No. 4,191,860 issued Mar. 4, 1980, to Weber discloses a system for providing special processing of incoming calls via a number of local switching offices based on information stored in a central data base. The local and toll offices of the telephone network compile a call data message and forward that message via a CCIS link to the central data base, essentially a Service Control Point or SCP. The data base at the SCP translates the dialed INWATS number, included in the message, into a call control message. The call control message includes an unlisted destination telephone number, which is then returned to the offices of the network via CCIS link. The network uses the call control message to complete the particular call.

U.S. Pat. Nos. 4,611,094 and 4,611,096 both to Asmuth et al. disclose systems for providing custom incoming telephone call processing services to a corporate customer operating at geographically dispersed locations through a plurality of local office switches. A customer program stored in a central data base is accessed to provide instructions to the switches to complete incoming calls to customer locations in accord with special services defined by the corporate customer. Incoming calls to the customer are routed to an Action Control Point (ACP) which typically is a modified toll office. The ACP has a number of "primitive" call processing capabilities, such as providing voice prompts to callers and receiving additional caller inputs. The customer program controls the ACP's to string together the desired primitive call processing capabilities to process each call to the customer. Specified parameters stored in the program, such as time of day, caller location and data inputs responsive to the voice prompts, determine the final customer station to which each call should be completed. The customized call processing disclosed by Asmuth et al. can also include customized billing for calls, e.g, by splitting charges between the customer and the caller. The Asmuth et al. system sets up a billing record for each call in the ACP or toll office. Asmuth et al. also teach procedures for handling of calls directed to a corporate customer when the call serving office does not have all of the capabilities needed for processing the call in accord with the customer's stored program. In particular, upon recognition of the deficiencies of the call serving office, the Asmuth et al. system transfers call processing to a second office having adequate capabilities for completion of the call.

U.S. Pat. No. 4,788,718 issued Nov. 29, 1988, to McNabb et al. suggests centralized recording of call traffic information. The architecture is similar to that disclosed by the earlier discussed patents to Weber and Asmuth et al. to the extent that local and toll offices communicate with a central data base via CCIS link. The McNabb et al. system improves over the incoming call routing provided by the Weber patent and the two Asmuth et al. patents discussed above by adding a data gathering function to the centralized data base which stores the individual customer's call routing program. In McNabb et al., the central data processor provides call attempt records and a traffic data summary of all calls directed to a particular 800 number.

U.S. Pat. No. 4,757,267 issued Jul. 12, 1988, to Riskin teaches routing of an 800 number call, where the dialed number identifies a particular product or service, to the nearest dealer for the identified product or service. The toll office sends a message including the dialed 800 number and the area code of the caller to a data base which translates this into a standard ten digit telephone number for the nearest computer at a Customer/Dealer Service Company (CDSC). The telephone network then routes the call to this computer, which answers the call and provides a synthesized voice response. The computer uses call data and or Touchtone dialed information from the caller to identify the selected product or service and then accesses its own data base to find the telephone number of one or more nearby dealers in that product or service. The computer then calls the dealer and connects the original caller to the called dealer.

Several other patents use a network similar to the AIN type intelligent network to provide personalized services to individual subscribers, for example when they are away from their home telephone station.

U.S. Pat. No. 4,313,035 issued Jan. 26, 1982, to Jordan et al. patent discloses a method of providing a person locator service through multiple exchanges of the switched telephone network. Each subscriber is assigned a personal number uniquely identifying the subscriber. An absent subscriber inputs a number to which calls are to be completed, such as the number where the subscriber can be reached, into a central data base. A caller wishing to reach the subscriber dials the number uniquely identifying that subscriber. In response to an incoming call directed to the unique number, a telephone switching office having access to CCIS sends the dialed number to the central data base referred to by Jordan et al. as an SSP. The data base retrieves the stored completion number for the called subscriber and forwards that number back to the switching office to complete the call. The subscriber can update the stored data from any telephone. Also, the subscriber can specify whether to charge calls via the person locator system to the subscriber or to the caller. U.S. Pat. No. 4,899,373 issued Feb. 6, 1990, to Lee et al. discloses a system for providing special telephone services to a customer on a personal basis, when the customer is away form his or her home base or office. A nationally accessible data base system stores feature data in association with personal identification numbers. A subscriber wishing to use personalized features while away from home base dials a special code from a station connected to any exchange which has access to the data base and presents the personal identification number. The corresponding feature data is retrieved from the data base and stored in the exchange in association with the station from which the request was initiated. The exchange then provides telephone service corresponding to the subscriber's personalized telephone features. A temporary office arrangement may be established in which the personalized features will be immediately available on incoming and outgoing calls for a period of time specified by the subscriber.

Further modifications of the AIN system allow a TELCO to customize the routing of telephone calls via a graphical programming language used on a specialized terminal by telephone company personnel.

Integration of wireless communication networks, such as cellular communication systems, and landline AIN's has been carried out in the manner disclosed by U.S. Pat. No. 5,353,331 to Emery et al., incorporated herein by reference. This system also provides for the use of Personal Communication Systems (PCS). FIG. 2 depicts the modifications needed to the AIN of FIG. 1 in order to accommodate the use of cellular communication data with the AIN in order to carry out functions necessary to provide personal communication service.

SSP's can be programmed to recognize a number of different triggers as an indication that a call is an AIN call. For example, the trigger can relate to the identification of the telephone line from which a call or other request for service originates, and such a trigger is useful for activating certain services to be discussed later. At least initially, however, for incoming PCS type calls the trigger is based on a recognition that the terminating station identified by the destination number is a PCS subscriber.

As shown in FIG. 2, all of the CO's 11, 13, 15, 17 and 19 are equipped and programmed to serve as SSP's. Such central office switching systems typically consist of the above discussed class 4/5 programmable digital switch with CCIS communications capabilities. One current example of such a switch is a 5ESS type switch manufactured by AT&T; but other vendors, such as Northern Telecom and Seimens, manufacture comparable digital switches which could serve as the SSP's. The illustrated embodiment is perhaps an ideal implementation which would make the Personal Communication Service widely available at the local office level throughout the network. Other implementations provide the SSP functionality only at selected points in the network, and telephone end offices without such functionality forward calls to one of the SSP's.

A number of subscriber telephone lines connect to each of the SSP's which provide switched telephone communications services to subscriber terminals coupled to those telephone lines. Many of the TELCO's subscriber's will still have ordinary telephone terminals, as shown. Those who subscribe to PCS will have a home base unit, such as shown at 12, 14, 16 and 18. The base unit may be the only terminal device connected to a particular telephone line, as is base unit 12, or the base may connect to the line in parallel with one or more standard telephone station sets as does base unit 14.

To provide wireless mobile communications, the network further includes a number of Mobility Controllers or "MC's" which communicate with the SSP's, STP's and ISCP of the AIN type telephone network. As shown in the drawing, the network includes cellular MC's 22 and 26 and MC's 24 and 28 constructed specifically for PCS. Each of the MC's connects to an SSP type central office switch via a voice telephone trunk, shown in solid lines. MC's 22, 24, 26 and 28 each also connect to one of the STP's via an SS#7 link.

The system for implementing Personal Communication Service in one telephone company service area or perhaps one LATA includes a number of the SSP capable CO switches, such as the SSP's shown at 11, 13, 15, and 17. The SSP type central offices are each at a different location and distributed throughout the area or region served by the PCS system. The PCS system of one regional TELCO will connect to networks serving other regions, for example the networks of other TELCO's. The switch 19 in FIG. 2 represents one of the SSP switches of a second TELCO implementing a PCS service.

The SSP's 11 and 13 connect to a first local area STP 23, and the SSP's 15 and 17 connect to a second local area STP 25. The connections to the STP's are for signalling purposes. As indicated by the black dots below STP's 23 and 25, each local area STP can connect to a large number of the SSP's. As shown by solid lines in FIG. 2, the central offices or SSP's are interconnected to each other by trunk circuits for carrying telephone services.

The network of the second TELCO can have an architecture essentially similar to that described above. For example, as shown in FIG. 2 the SSP 19 connects to a first local area STP 27 via an SS#7 link, and SSP 19 connects to one or more central offices or SSP's including SSP 17 by means of trunk circuits for carrying telephone services. The local area STP 27 communicates with a state or regional STP 33 of the second TELCO. The STP 33 provides CCIS type data communications with the second TELCO's ISCP 50 and with the SSP's and ISCP's of other TELCO's, for example by packet switched connection to STP 31. The link between the SSP 19 and the local area STP is a CCIS link, typically an SS#7 type interoffice data communication channel. The local area STP is connected to the regional STP 33 via a packet switched network also typically SS#7. The regional STP 33 also communicates with the ISCP 50 via a packet switched network. The second TELCO's network further includes a number of MC's such as MC 34, each of which will communicate with the SSP's, STP's and ISCP of the AIN type telephone network. Like the MC's of the first TELCO, MC 34 connects to an SSP 19 via a voice telephone trunk, shown as a solid line. MC 34 also connects to the local area STP 27 via an SS#7 link.

The above described data signalling network between the CO's and the ISCP is preferred, but other signalling networks could be used. For example, instead of the CCIS links, STP's and packet networks, a number of MC's together with several CO's and an ISCP could be linked for data communication by a token ring network. Also, the SSP capability may not always be available at the local office level, and several other implementations might be used to provide the requisite SSP capability. For example, none of the end office switches may have SSP functionality. Instead, each end office would connect to a trunk tandem which in turn feeds calls to a central SSP capable switch. The SSP then communicates with the ISCP, as in the implementation described above, but in this case via an SS#7 type CCIS link. In another embodiment, some of the end offices are SSP capable, and some are not. Again, each of the end offices normally communicates through a trunk tandem. For the SSP capable switches, they communicate directly with an STP which relays communications to and from the ISCP, in the same manner as in the embodiment of FIGS. 1 and 2. For those end offices which lack SSP capability, calls are forwarded to the SSP capable trunk tandem which in turn relays data to and from the ISCP. In these alternate embodiments, the SSP capable trunk tandem switches are digital switches, such as the SESS switch from AT&T; and the non-SSP type end offices might be 1A analog type switches.

The Mobility Controllers (MC) such as 22 (as known as Mobile Telephone Switching Offices (MTSO) are connected with each other via IS-41 protocol trunks for exchange of data relating to handoff and to exchange of data for extending services to visiting subscribers of distant cellular systems who are not subscribers to PCS. The IS-41 data trunks are actually a packet switched network, which may be either an X.25 network or an SS#7 network. To provide handoff during a wireless call in progress, the MC's are also interconnected via trunk circuits (not shown).

To allow data communication of HLR data registered in the ISCP's 40, 50, to visitor location registers in remote MC's, the network further includes a hub STP 53. The hub STP connects to an X.25 packet switched data network, which currently carries IS-41 data messages between existing MC's outside the PCS service area. The hub STP 53 couples IS-41 messages between the X.25 network and the SS#7 network, shown by the dotted line data communication link to the regional STP 33. The communication through the hub STP 53 allows outside MC's to communicate with the ISCP's of both TELCO's providing the PCS type services as if the ISCP's 40, 50 were home location MC's for the PCS subscribers when PCS subscriber is visiting another service area.

The messages transmitted between the SSP's and the ISCP's are all formatted in accord with the Transaction Capabilities Applications Protocol (TCAP). The TCAP protocol provides standardized formats for various query and response messages. Each query and response includes data fields for a variety of different pieces of information relating to the current call. Of particular note here, an initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

The ISCP 40 is an integrated system. Among other system components, the ISCP 40 includes an SMS 41, a DR&S) 45 and the actual data base or Service Control Point (SCP) 43. The ISCP also typically includes a terminal subsystem referred to as an SCE (not shown) for programming the data base in the SCP 43 for the services subscribed to by each individual business customer. Although not shown in detail, other ISCP's such as 50 will typically have a similar integrated system structure. Alternatively, ISCP 50 may not be an "integrated" system. For example, the second unit 50 may include only a data base system similar to that of the Service Control Point (SCP) 43.

For standard telephone service, each central office switching system normally responds to a service request on a local communication line connected thereto to selectively connect the requesting line to another selected local communication line. The connection can be made locally through only the connected central office switching system. For example, for a call from station A to station B, the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnection the two CO's.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited trunk capacity. The CCIS system through the STP's was developed to alleviate this problem.

In the CCIS type call processing method the local central office suspends the call and sends a query message through one or more of the STP's. The query message goes to the central office to which the called station is connected, referred to as the "terminating" central office; for example, the query would go from originating SSP 11 to terminating SSP 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

The call processing routines discussed above are similar to those used in existing networks to complete calls between stations connected to landlines. In an AIN system implementing Personal Communication Service, these normal call processing routines would still be executed for completion of calls originating from stations not subscribing to the Personal Communication Service.

In one implementation, the local SSP type CO's are programmed to recognize any call directed to any one of the PCS subscribers associated therewith as a Personal Communication Service Call. In response to such a call destination type trigger, the CO associated with the destination subscriber, i.e the terminating SSP, would communicate with the ISCP via an STP to obtain all necessary call processing data to complete the PCS call to the subscriber's portable handset at its current location. It is also possible to program originating SSP's to determine whether or not outgoing calls are directed to PCS subscribers and trigger the communications with the ISCP at the originating SSP instead of the terminating SSP.

To extend special telephone services from the AIN to subscribers communicating via the mobile network will require adapting the MC's to trigger queries to the ISCP in response to outgoing call or service requests. One way to do this is to modify the switch structure and programming of the MC's so that each MC includes SSP functionality similar to that of the telephone network SSP's. Another approach is to modify the MC's to forward calls to an SSP capable switch or tandem, with outpulsing of the originating subscriber data, so as to process the calls via the tandem in manners similar to those used for non-SSP capable end offices switches discussed earlier.

As the scope of AIN operation increases, additional burdens are placed upon the CCIS system necessary to carry out the triggering function that is at the heart of the AIN functionality. Also, not all company office switches are programmed for SSP functionality. Nor are there always landline data links to carry the CCIS operation between crucial elements of the system. The lack of these two elements in any given area may render effective use of an AIN impossible. Replacing or retrofitting existing company office switches can be expensive and time consuming, as can the installation of additional landline data links.

Despite the elegance of the PCS arrangement of the Emery et al. patent, interfaces between mobile subscribers and the AIN are often awkward. This limits the amount and type of data that can be input to an AIN system by a mobile subscriber. Thus, mobile subscribers are often unable to enjoy the benefits of all the calling features currently available to AIN landline subscribers, and which could be made available to mobile subscribers.

DISCLOSURE OF THE INVENTION

One object of the present invention is to provide a parallel CCIS for a landline AIN.

Another object of the present invention is to provide a technique whereby a wireless subscriber can directly input data to an AIN.

Yet an additional object of the present invention is to provide simultaneous voice and data communication for a wireless subscriber station.

Yet an additional object of the present invention is to provide a control signal system that interfaces easily with both mobile telephone systems and landline AIN's.

Still a further object of the present invention is to provide control signalling capability without additional installation of landline data links.

These and other advantages of the present invention are achieved by a combined landline and wireless communication system including an Advanced Intelligent Network (AIN) including switching entities and control and a Common Channel Interoffice Signalling (CCIS) system connecting the switching and control entities of the AIN. Also included is a Cellular Digital Packet Data (CDPD) arranged for communication with wireless subscriber units, and having a plurality of Mobile Data Base Stations (MDBS) and at least one CDPD controller. Further included are an interface between the AIN'system and the CDPD system as well as means for translating between CDPD protocol and CCIS protocol.

Another aspect of the present invention includes a method for providing control signals to an Integrated Service Control Point (ISCP) in a landline AIN including a first step of generating at a wireless subscriber station a call message including the subject control signals. In the next step, the call message is transferred over a CDPD system from the wireless subscriber station to an MDBS dedicated to CDPD operation. In the next step, the call message is transmitted from the MDBS to a CDPD control entity and a portion of the call message is identified to trigger transmission from the CDPD control entity to an AIN entity. The CDPD protocol is translated to CCIS protocol, and in the final step, a second portion of the call message is identified to trigger transmission to the ISCP via the CCIS data lines.

In another aspect of the present invention, the advantages are achieved by a control system that exerts control over a landline AIN and an analog cellular voice system, as well as a CDPD system. For this control, a CCIS as part of the AIN, is used to carry control signals that are generated in the NMS. The NMS include interfaces with both the landline AIN and the analog cellular voice system. The NMS also includes a protocol translator and means for generating instructions to all three of the CDPD (AIN) and analog cellular voice system.

BEST MODE FOR CARRYING OUT THE INVENTION

As described below, a CDPD system is used as a supplement to the landline CCIS system currently used to convey control signalling between Service Switching Points (SSP), Signalling Transfer Points (STP) and Integrated Service Control Points (ISCP). The various arrangements for using this invention differ as to the interface between the CDPD system and the landline AIN. The key element of the present invention is that a wireless subscriber uses the CDPD system to convey control signals eventually to an ISCP of an AIN in order to obtain transaction authorization or to specify calling features to be provided either on a landline subscriber station or to the mobile station itself if such calling features are available. The present invention also permits authorization for transactions or the provisions of calling features based upon control signals originated at a wireless station and sent via a CDPD system to an ISCP of a landline AIN.

CDPD Operation

In order to appreciate the present invention, a brief description of CDPD operation and systems is necessary.

The efficient wireless communication of both voice and data signals in an integrated package has been accomplished in part through the use of cellular digital packet data (CDPD) systems as specified in the CDPD specification, Version 1.1 (incorporated herein by reference). Normally, the CDPD communication system shows the same carrier frequencies assigned to the analog voice channels as described in Part 405 of the CDPD specification. Preferably the CDPD system operates most efficiently with an advanced mobile phone system (AMPS).

This is the system authorized by the FCC in 1981 to use 666 cellular radio frequency channels in two bands of frequencies 825 to 845 MHz, and 870 to 890 MHz. The lower half of each band, called the A band, is designated for wire line carriers, which are defined roughly as operating telephone companies. The upper half or B band, is designated for non-wire line carriers, which are the non-telephone company common carriers. The FCC grants licenses in both bands to serve a cellular geographic serving area (CGSA). A CGSA corresponds to a standard metropolitan statistical area (SMSA), which is a major metropolitan area defined by the Office of Management and Budget. The FCC requires that a license application cover 75% of the GCSA's (S surface area within two years of the date of operation). All AMP systems comply with the most recent version of the IS-54 standard.

Figure 3:
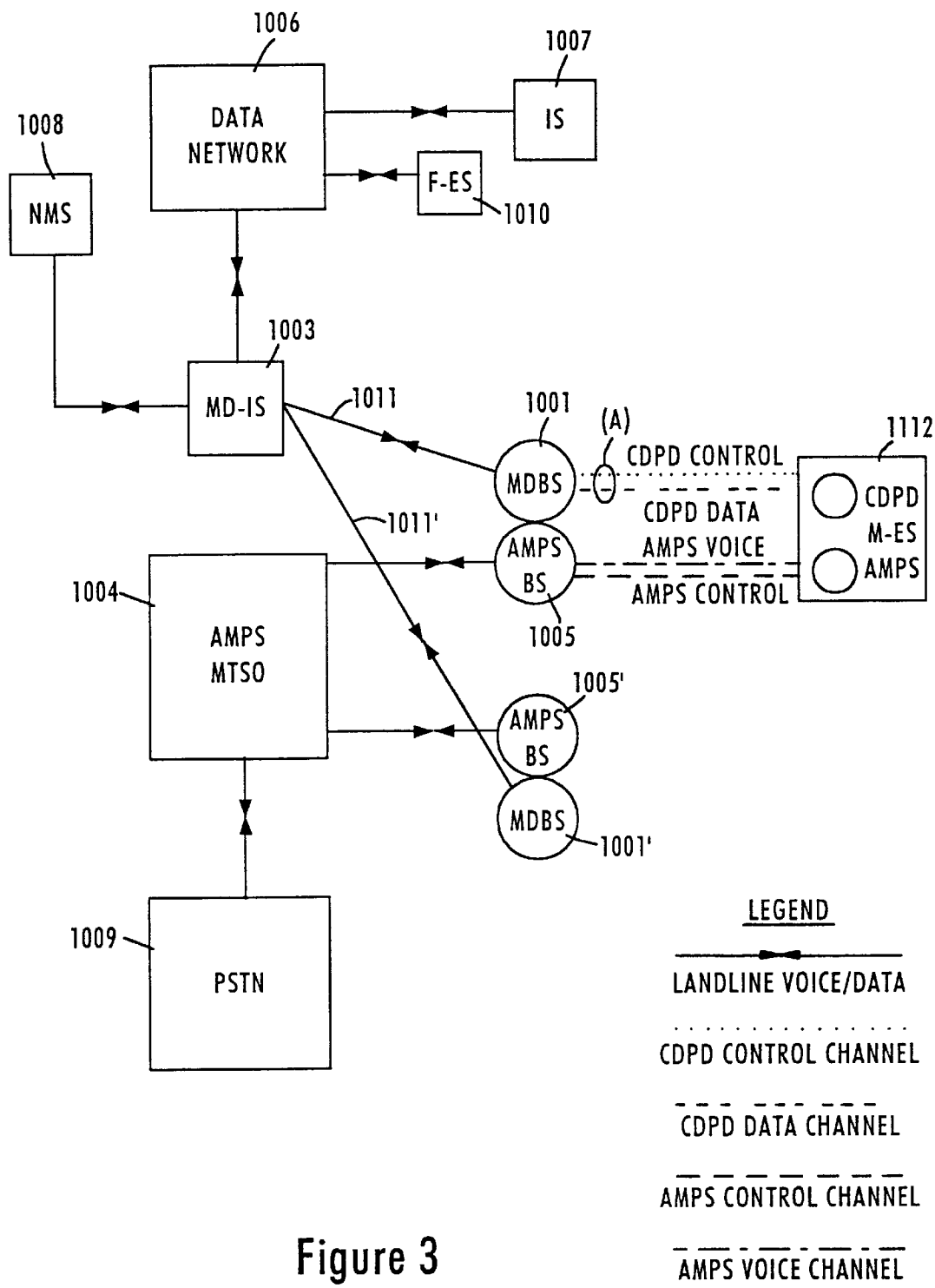
FIG. 3 depicts a typical Cellular Digital Packet Data (CDPD) system.

The typical base unit or mobile data base station (MDBS 1001, as illustrated in FIG. 3) of a CDPD system utilizes a channel within an AMPS cell to establish a link and communicate to a user's wireless subscriber station. The MDBS may use other frequencies outside of AMPS that are made available to it by carrier or service providers. The wireless subscriber station (M-ES 1002) is a portable computer, handset or other portable electronic device containing a subscriber communication station. The MDBS serves as a communications link between the user of the wireless subscriber station M-ES 1002 and a carrier or service provider's network of wire lines, microwave links, satellite links, AMPS cellular links, or other CDPD links (such as mobile data intermediate system MD-IS 1003 and other intermediate systems 1006) to convey data to another wireless subscriber station, computer network, or non-mobile or a fixed end-user system (F-ES 1010).

The CDPD network is designed to operate as an extension of existing communication networks, such as AMPS networks and the Internet network. From the mobile subscriber's perspective, the CDPD network is simply a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network, which is "unaware" of the CDPD function.

The CDPD system employs connectionless network services (CLNS) in which the network routes each data packet individually based on the destination address carried in the packet and knowledge of current network topology. The packetized nature of the data transmissions from an M-ES 1002 allows many CDPD users to share a common channel, accessing the channel only when they have data to send and otherwise leaving it available to other CDPD users. The multiple access nature of the system makes it possible to provide substantial CDPD coverage to many users simultaneously with the installation of only one CDPD station in a given sector (transmitting range and area of a standard AMPS base station transceiver).

The airlink interface portion of the CDPD network consists of a set of cells. A cell is defined by the geographical boundaries within the RF transmission range from a fixed transmission site such as MDBS 1001, which can be received at acceptable levels of signal strength by mobile subscribers such as M-ES 1002. The transmitter supporting the cell may be located centrally within the cell, with transmission being carried out via an omni-directional antenna, or the transmitter located at the edge of a cell and transmitted via a directional antenna to cover only a portion of the cell, referred to as a sector. In typical configurations, the transmitters for several sectors are co-located. The area served by a set of cells has some area overlap so that a roaming wireless subscriber station can maintain continuous service by switching from one cell to an adjacent cell in a manner roughly analogous to the standard hand-off in an AMPS system. The two cells are considered to be adjacent if an M-ES 1002 can maintain continuous service by switching from one cell to the other. This switching process, called cell transfer, is done independently of normal AMPS hand-off procedures.

In FIG. 3, the interface (A) between the wireless subscriber station 1002 and the MDBS 1001 is an "air interface" constituted by a radio frequency link using standard AMPS frequencies. The interface (A) is shown as both CDPD control channel and a CDPD data channel. However, the functions of both channels can be carried out on a single CDPD channel. In most cases, the use of a single channel greatly simplifies CDPD operation, thereby providing one of its chief benefits. The MDBS 1001 is connected to other mobile data base stations through a mobile data intermediate system (MD-IS) 1003. A number of mobile data base stations can be under the control of a single mobile data intermediate system. The mobile data intermediate systems are connected to each other through intermediate systems such as 1006, 1007 in FIG. 3.

An intermediate system (MD-IS) is constituted by at least one node connected to more than one sub-network (such as intermediate system MD-IS 1003). The intermediate system has a primary role of forwarding data from one sub-network to another. The mobile data intermediate system MD-IS 1003 performs data packet routing based on knowledge of the current location of each wireless subscriber station within the range of the mobile data base stations under the control of the MD-IS. The MD-IS is the only network entity that is "aware" of the location of any of the wireless subscriber stations. However, under some circumstances (as defined by the CDPD specification, Version 1.1), particular mobile data base stations will keep track of behavior of specific wireless subscriber stations. A CDPD-specific Mobile Network Location Protocol (MNLP) is operated between each MD-IS (through the intermediate system) to exchange location information regarding the wireless subscriber stations.

The overall CDPD network is controlled by a network management system (NMS) 1008 having an interface with at least one mobile data intermediate system 1003. Using a special protocol, programming instructions can be transmitted from the NMS 1008 through the MD-IS 1003 to any number of mobile data base stations under proper conditions. NMS can be used to program each source of CDPD transmission, such as the mobile data base stations 1001, 1001'. This would be done in the same manner in which system operating parameters are conveyed to the mobile data base stations.

Immunity of certain CDPD channels from analog voice pre-emption is more complicated, and requires coordination between the controller of the CDPD network and the controller of the analog voice cellular system. The problems associated with such coordination are largely administrative since two different service providers operate the respective CDPD and analog voice cellular systems.

Programming instructions can be used to convey useful network data to the MDBS 1001, as well as configure the operation of an MDBS with respect to such critical features as maintaining channel queues. The NMS 1008 also controls other CDPD system characteristics such as the timing of paging messages to coincide with non-dormant periods of the M-ES 1002 handsets. One advantage of CDPD is the capability of providing operating instructions to mobile data base stations from the NMS through an MD-IS 1003, or by a direct connection to the MDBS 1001 as outlined in the description of MDBS architecture found in the CDPD specification, Version 1.1, Parts 402 and 403.

FIG. 3 also depicts a comparison between the CDPD network and a standard analog cellular voice network (AMPS). The MDBS 1001 is the CDPD equivalent of an AMPS base station 1005. Both serve as links to mobile users 1002. Both AMPS and CDPD functions can be handled by the same subscriber handset or end system equipment (M-ES 1002). Also, the MDBS 1001 is preferably co-located with the AMPS base station 1004.

The MD-IS 1003, which acts as a local controller for the CDPD mobile data base stations connected to it, is generally equivalent to the mobile telephone switch office (MTSO) 1004 used to control a plurality of AMPS base stations 1005, 1005'. In the AMPS system, the MTSO 1004 can be connected to the various base stations 1005, 1005' by way of communication links, either over dedicated landlines or through a Public Switched Telephone Network (PSTN 1009). Likewise, the connection between MD-IS 1003 and the various mobile data base stations 1001, 1001' controlled thereby is made in the same manner. However, some different signaling protocols are used than those found in the AMPS system.

In comparison to AMPS, the infra-structure requirements of CDPD are very small. CDPD base station equipment is preferably located at a cellular carrier's cell site with existing AMPS base station cellular equipment. The multiple access nature of the CDPD system makes it possible to provide substantial CDPD coverage to many users simultaneously with the installation of only one CDPD radio in a given sector. This multiple access is the result of a mobile end-system accessing the CDPD channel only when there is data to be sent.

The AMPS base station and the MDBS can use the same RF equipment if both are co-located. By contrast, the MTSO of the AMPS system and the MD-IS 1003 of the CDPD system do not have to be co-located in order to share RF links. In the AMPS system, the MTSO 1004 has the responsibility of connecting the AMPS base station and the mobile station to another party through a PSTN 1009. The intermediate system (data network 1006) of the CDPD corresponds to the use of the PSTN by the AMPS system. Like the AMPS system, the CDPD system must also use the public switch telephone network or another landline network for completing calls to remote parties or systems via a phone system terminal network (not shown). However, the CDPD system employs a different protocol than that used by the AMPS system for completing calls over a PSTN.

The MDBS maintains a number (up to the MDBS transmission capability) of channel streams across the airlink interface, as directed by the MD-IS controlling that MDBS. The MDBS instructs all wireless subscriber stations to change channels when necessary such as when an AMPS communication is detected on the CDPD channel. Each wireless subscriber station's terminal stream is carried on one channel stream at a time, normally selected by the mobile subscriber, preferably based upon data received from the MDBS regarding optimum channels for CDPD use. The forward and reverse traffic in a given cell (the terminal stream of the MDBS) is carried on a single DS0 trunk 1011, between the MDBS and the MD-IS. Communication between the MDBS and the MD-IS over the DS0 trunk follows standard formats such as T1.

Within the CDPD network, digital data is transmitted between the MDBS 1001 and the M-ES 1002 using Gaussian Minimum Shift Keying (GMSK) modulation. Transmissions from the base station to the wireless subscriber station M-ES are continuous. Those from wireless subscriber station M-ES to the MDBS use a burst mode in which wireless subscriber station M-ES accesses a channel only when it has data to send and the channel is not being used by other mobile wireless subscriber stations. This allows multiple mobile wireless subscriber stations to share a single channel, and for data transmission characterized by intermittent transactions of relatively small amounts of data, greatly reducing the connection time compared to that when sending digital data over conventional circuit-switched cellular modems.

Unlike the signaling schemes used in conventional cellular modems, which have been chosen based on the need to operate within the constraints of the existing voice signaling system, the GMSK modulation technique used for CDPD communication is explicitly selected with the intent of obtaining both very high bit transmission rates and good error performance in cellular channels. The fact that the choice of modulation was not constrained by a pre-existing signal structure allows CDPD systems to achieve substantially greater instantaneous bit rates at very low received signal levels when compared to those of conventional cellular modems. This means that CDPD communication systems will provide reliable, high speed data transmission in many areas where signal quality is inadequate for good cellular modem performance. Presently, the raw (baseband) digital data being transferred across CDPD include electronic mail messages, digital fax data, or other digital data representing a network connection such that files may be transferred as if currently connected to a local area network.

The mobile data intermediate system MD-IS 1003 handles the routing of packets for all visiting wireless subscriber stations in its serving area. Two services are performed by the MD-IS are: a registration service maintaining an information base of each M-ES currently registered in a particular serving location; and a readdress service, decapsulating forwarded packets and routing them to the correct cell. The serving MD-IS also administers authentication, authorization and accounting services for the network support service applications.

A CDPD communication system can operate with dedicated channels set aside from the pool of cellular voice channels and reserved for CDPD use. In the alternative, in a more typical mode of operation, the CDPD communication system can use idle time on channels that may also be used by AMPS communications. In this second case, the mobile data base station may perform "RF sniffing" to determine which channels are available and detect the onset of voice traffic on the channel currently being used for CDPD communication. If an AMPS cellular unit begins transmitting on a channel occupied by a CDPD communication, the CDPD unit ceases transmitting on that channel and switches to another available channel (a process called "channel hopping") or if no other channel is available, ceases transmission until a channel becomes available for CDPD use.

Although the CDPD system shares existing AMPS radio frequency channels, AMPS calls are given first priority, and they are always able to preempt the use of any channel being used by CDPD. However, the cellular carrier or service provider may opt to dedicate one or more channels to CDPD usage. In this case, AMPS calls will never pre-empt the channels dedicated to CDPD use.

In normal operation, the MDBS will carry out channel hopping to avoid channels to be used for AMPS communications. To do this, the MDBS performs a monitor activity on AMPS channels, and maintains a list of the status (occupied by voice or unused) for each channel available for CDPD use at the cell. The MDBS selects a channel for CDPD use from the unused channels in the list based on a combination of criteria (not specified in the CDPD standard). These could include such considerations as the likelihood that the channel will be required by the voice system in the near future, the amount of interference present on the channel, the amount of interference that the CDPD communication is likely to cause to other voice users in different cells, or on other sectors, and other factors. The MDBS transmits a list of all channels available for CDPD use (whether currently occupied by a voice communication or not) to the wireless subscriber stations. The MDBS may execute a channel hop before the channel is preempted by AMPS communication if the MDBS determines that another channel is more suitable. In such a case, the MDBS sends a message to the wireless subscriber stations commanding them to change to the specific channel selected, and then the MDBS executes the hop. This sort of hop is much more orderly and efficient than an unplanned hop since the wireless subscriber stations do not have to search for the next channel.

If the present CDPD channel is pre-empted by AMPS communication, the MDBS selects another channel from those unused by AMPS communications and immediately hops to it without informing the wireless subscriber station (an unplanned hop). The wireless subscriber station then determines that the CDPD signal is no longer present on the current channel and searches the other channels in the list to determine the channel (if any) to which the CDPD communication has hopped.

Normally, a subscriber station equipped for CDPD operation, as will be described, infra, is able to remain in a low-power, sleep mode. This sleep or dormant mode requires minimum power expenditure. Consequently, extended periods in the sleep mode will result in longer battery life for the subscriber station handset.

For example, by remaining in the CDPD sleep mode as often as possible, a battery's life can be extended so that at full transmission power, the handset is able to operate for at least an hour, and during standby time while monitoring for AMPS control channels, the subscriber station handset is able to operate for at least twelve hours. The sleep mode operation of a CDPD system and subscriber stations within that system is essentially a matter of predicting when the CDPD system will be sending a list of paging signals so that listening subscriber stations need monitor only for a short amount of time to determine if there are pending messages.

Subscriber Station Control

Figure 5:
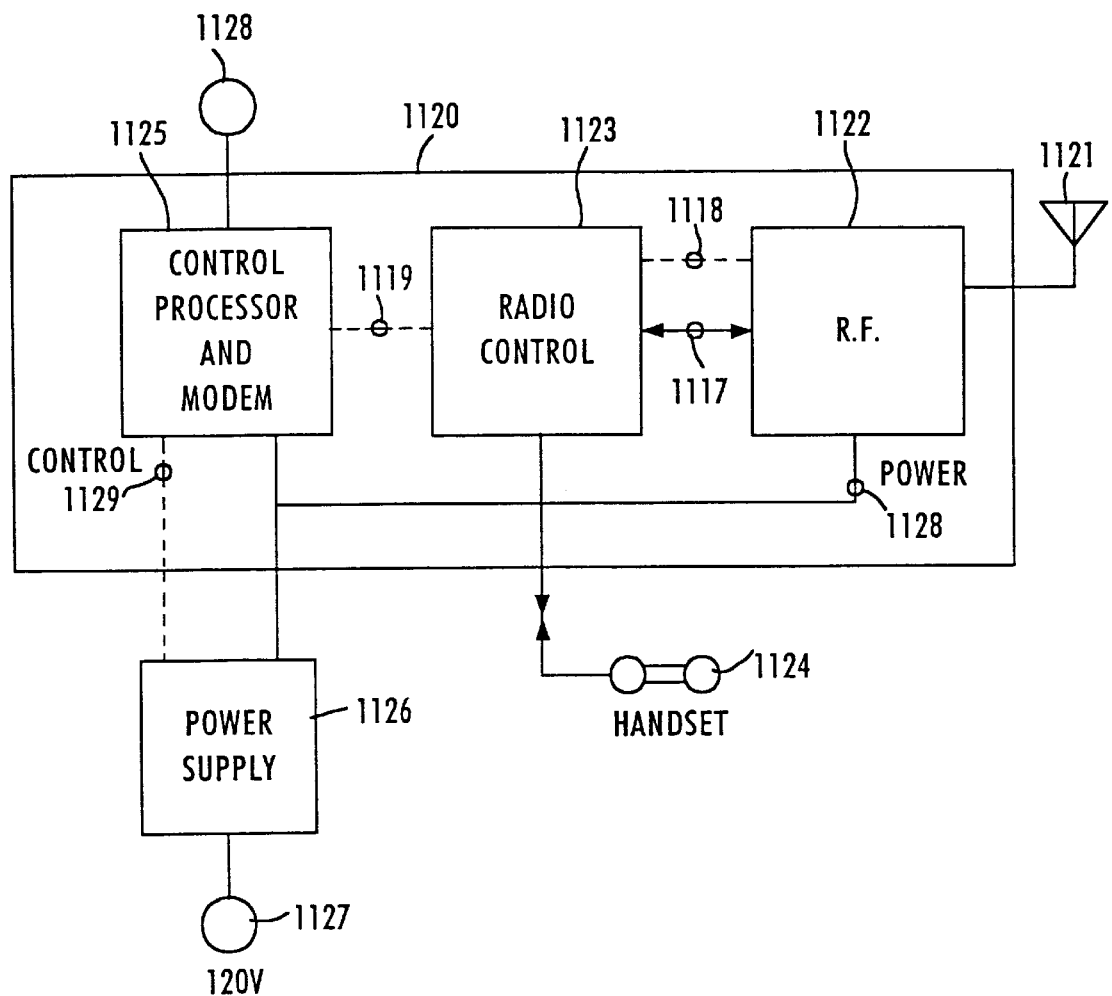
FIG. 5 is a block diagram depicting a handset needed to carry out analog cellular voice and CDPD communication.

Integration of cellular voice communication and data communication is facilitated by the device of FIG. 5. This wireless subscriber station is programmable and contains all of the functionality normally attributed to standard analog cellular voice subscriber stations. The device of FIG. 5 differs from normal AMPS subscriber station in that the processors constituting radio control 1123 and the control processor 1125 have the capability to control both cellular voice and CDPD communications, in conjunction with each other. Cellular subscriber stations having such functionality are already known, and are on the market. The representation in FIG. 5 simply depicts the functionality necessary to accommodate the programming which completes the final aspect of the present invention. In particular, the handset depicted in FIG. 5 must be able to generate the signal sequence that is passed along to an ISCP through the CDPD system. Such control signals corresponding to desired calling features or authorization requests can be pre-programmed into the handset and transmitted automatically by activating a code corresponding to the instructions conveyed by control signals. This can be done in a manner similar to speed dialing of pre-programmed telephone numbers.

This device includes a power supply 1126 having the capability to accommodate the power requirements of CDPD communication and AMPS communication. The power supply can also accommodate high voltage (120 volts AC) output for high power radio devices such as satellite communication systems and short wave amateur radio communications. Handset 1120 includes a radio frequency module 1122 having at least one radio frequency transceiver. However, the radio frequency module could also include a plurality of transceivers operating at different power levels and different frequencies. The radio frequency transceiver uses a main antenna 1121 for both receiving and transmitting the various types of signals handled by the handset, such as PCS, AMPS communication, circuit switched cellular data communication, and CDPD communication. If a plurality of transceivers are used, a plurality of antennas can also be provided. Another alternative is a diversity antenna (not shown), used as a backup to the main antenna 1121 for reception purposes under certain adverse conditions.

Radio control processor 1123 carries out the functions performed in any cellular handset. These include control of the registration sequence and handoff sequence in accordance with the overall cellular system constraints. Other functions include interfacing with a standard telephone handset 1124 available to the handset user for transmission and receipt of voice communication. Radio control processor 1123 sends voice and data communication via link 1117 to the RF module 1122, as well as control data over control data link 1118. Only voice communication is conducted between handset 1124 and radio control processor 1123. In addition, radio control processor 1123 is connected via data link 1119 to the control processor and modem 1125.

Processor 1125 is dedicated to the control of data communication, in particular, CDPD communication. The requirements for the programming of control processor 1125 are set forth in the CDPD specification (incorporated herein by reference). As previously stated, CDPD control applies to the overall radio control a mobile end user station 1120, but is subject to default when AMPS or other cellular voice communication is required. It is noted that AMPS communication is subject to default in accordance with the duty cycle of PCS communications described, supra. Consequently, the CDPD system will interpret PCS usage as being equivalent to AMPS usage. Control of the PCS operation can be relegated either to radio control processor 1123 or control processor/modem 1125. Programming such processors to carry out AMPS and PCS functions is a technique well known to practitioners in the radio telephone art.

Since CDPD communication, as well as personal communication systems are subject to the constraints of cellular communication systems in accordance with the IS54B standard, power requirements for the output of the mobile end user station are predetermined. When the handset 1124 and the overall transceiver are combined for close contact with the user, no more than 0.25 watts of power can be transmitted. In the alternative, 0.6 watts are permitted when handset 1124 is not integrated with the RF Section 1122, including antenna 1121. One advantage of the CDPD operation is that lower power levels can be maintained when in the CDPD mode and in the AMPS mode. Consequently, if control signals are to be sent from the wireless subscriber station to the landline network, it is advantageous with respect to extended battery life to send such signals in the CDPD mode of communication. Since the CDPD power levels are already specified in the CDPD specification Version 1.1 (previously incorporated herein by reference), power supply 1126 can be pre-programmed for the proper operating level when handset 1120 is maintained in the CDPD mode of operation.

Figure 1:
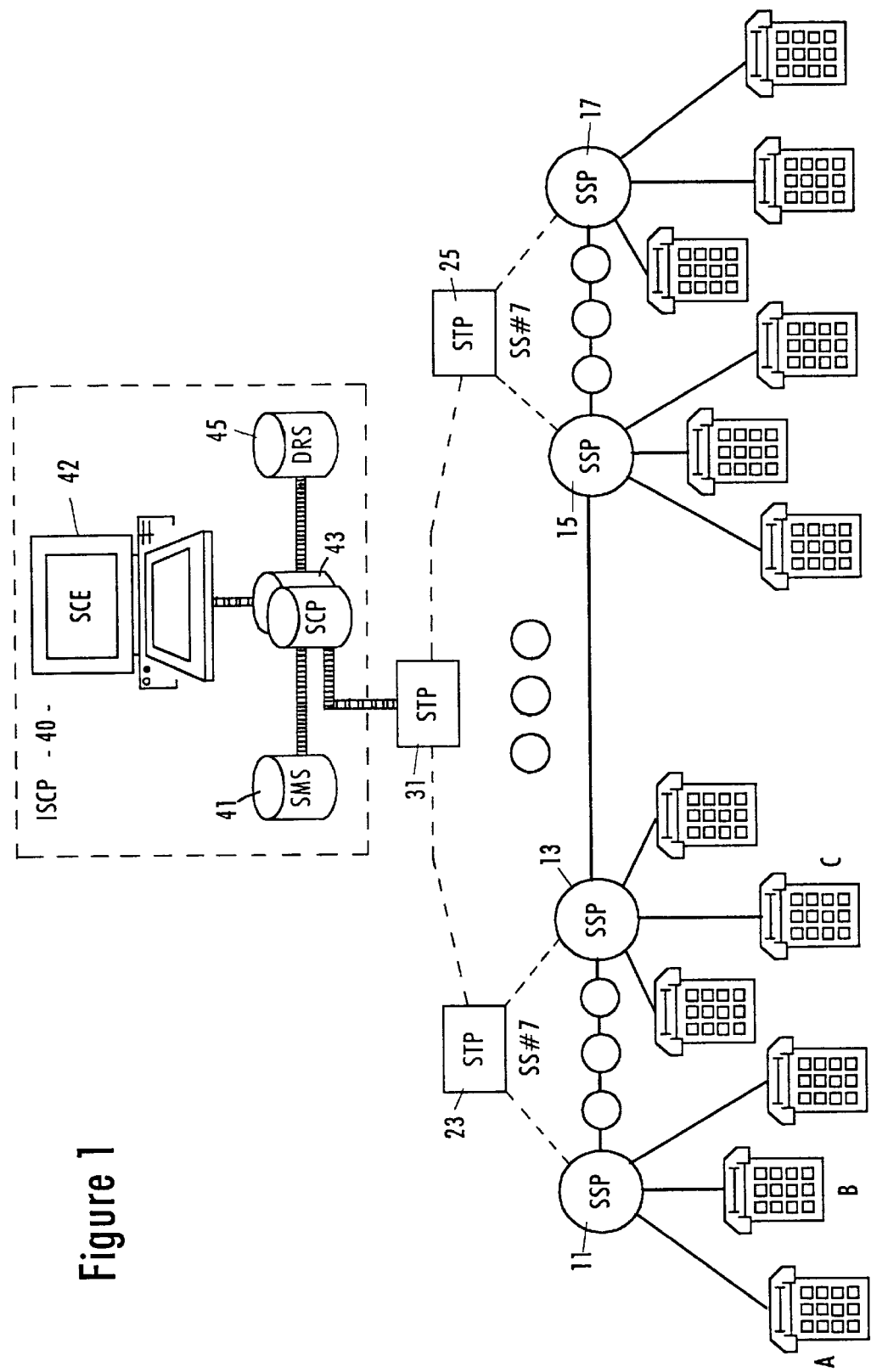
FIG. 1 is a block diagram depicting a typical AIN.

In order to communicate in the CDPD network, the wireless station 1120 communicates with a mobile data base station as depicted in FIG. 1 using GMSK modulation on AMPS radio frequencies and occupying an AMPS channel. According to this operation, the end user station will monitor received signal strength. Based upon the detected values of the received signal strength, the user station will locate the strongest CDPD channel and register on that channel in a local CDPD cell associated with a CDPD mobile data base station as depicted in FIG. 1. The end user station will also locate and switch to a new CDPD channel whenever the local mobile data base station switches channels. The CDPD system supports -hand-off to an adjacent cell if the mobile end user station changes location so as to cause received signal level changes.

By operating in the CDPD mode as described above, the subject end user station has the capability of sending data messages such as electronic mail input by a handset keypad (not shown) to others within the CDPD network. The end user station can also be used to transport data (via electronic mail/paging/fax) to and from a host computer associated with the end user station via an appropriate I/O port (connecting the end user station to the computer) and the CDPD network. Since the hand-off sequence in the CDPD mode mitigates against data loss, as indicated in the CDPD specification, successful data transfer can take place even when the mobile end user station is moving from one cell site to another. While in the CDPD mode, the mobile end user station is able to conserve battery power by remaining in a dormant or "sleep" protocol when data is not being sent or received. The characteristics of the sleep mode have been previously described in this application and are part of the CDPD specification (previously incorporated herein by reference).

The functionality of the subscriber station depicted in FIG. 5 can be provided using units sold specifically for this purpose by Motorola, Erickson, Siemens, Pacific Communication Sciences Inc. and others. It is not the design of the subscriber station that is critical to the present invention, but rather the use to which the subscriber station is put with respect to the AIN depicted in FIG. 2. It is the use of the subscriber station depicted in FIG. 5 that allows the practical integration of the CDPD system of FIG. 3 into the AIN of FIG. 2. With the proper integration of the CDPD system cellular system and AIN landline network, it is possible for a subscriber to originate control signals for the AIN at the mobile subscriber station. In effect, an alternate CCIS path is created through the CDPD network so that an ISCP can distribute instructions generated at the mobile subscriber station to an SSP. Thus, in some cases it may be possible to provide SSP functions to a central office switch without the landline CCIS connection. There are a variety of ways in which this functionality can be provided between the mobile subscriber station, the CDPD system and the AIN.

Figure 2:
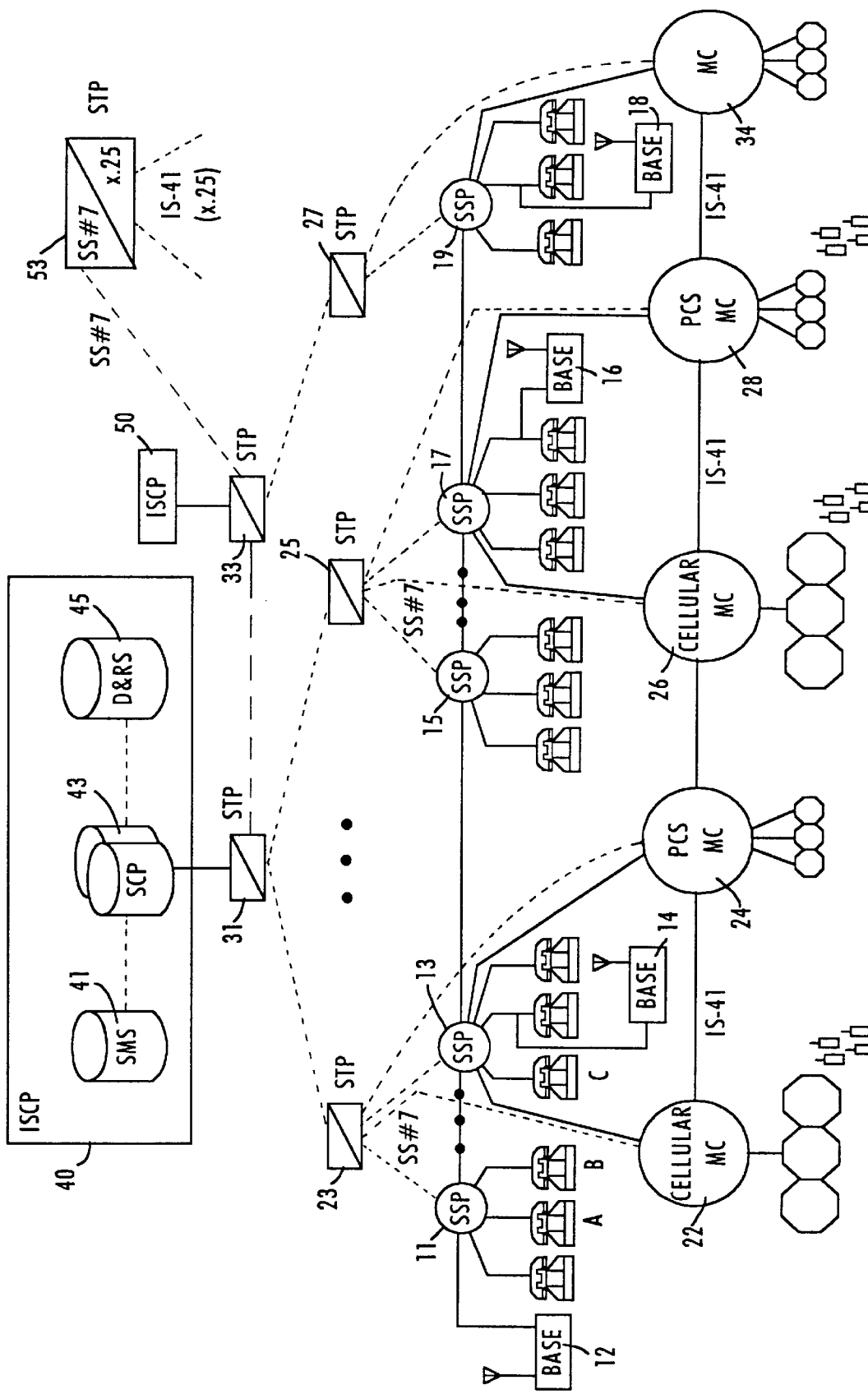
FIG. 2 is a block diagram depicting modifications of the system of FIG. 1 to carry out personal communication system activities.
Figure 6:
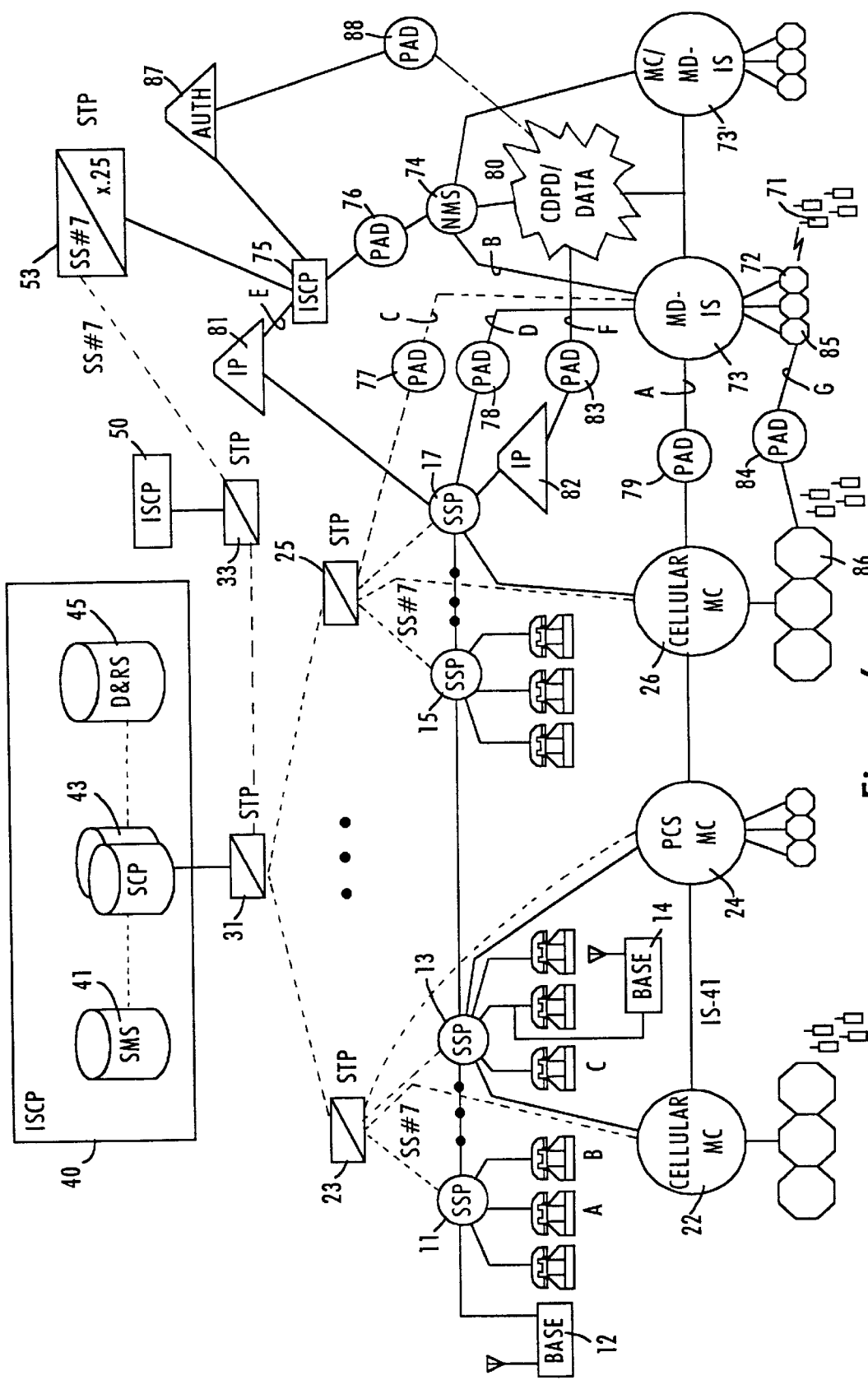
FIG. 6 is a block diagram depicting a plurality of connection schemes allowing data to be input to the AIN from a wireless subscriber station.

FIG. 6 depicts the landline AIN integrated with a cellular system and a personal communications system as previously illustrated in FIG. 2. Also included are CDPD structures used to interface with the AIN, as well as a CDPD/data network 80. As will be apparent from the following explanation, there are a number of ways in which the CDPD system can interface with either the AMPS or AIN landline systems.

Subscriber station 71 includes the functionality described with respect to FIG. 5 and thus is able to operate with an analog voice cellular base station 86 or a CDPD base station 72. As previously described, the subscriber station 71 will communication with only one system at any particular moment in time. However, simultaneous communication with both types of system is possible if a dual transceiver is included in the subscriber station. Normally the functionality of the analog cellular base station 86 and the CDPD mobile data base station 72 are separate from each other. However, it is convenient to locate both types of base station in the same physical location. As is well known, this is done for convenience of construction and to maximize the use of common RF elements for each type of base station, such as antennas, power amplifiers, power supplies, etc.

As the cellular base station 86 is controlled by a cellular Mobility Controller (MC) 26, also known as a Mobile Telephone Switching Office (MTSO), CDPD Mobile Data Base Station 72 is controlled by Mobile Data Intermediate System (MD-IS) 73. The mobile data intermediate sections such as 73 and 73' are controlled by a Network Management System (NMS) 74, that provides the timing parameters and general system operating parameters to the various controllers in other MD-IS's in the CDPD/data system 80. The necessity of NMS 74 for the overall control of the CDPD system has already been explained previously for normal operation of a CDPD system.

An additional convenience provided by the colocation of the mobility controller and the MD-IS is found in the mutual control that can be provided by a network management system 74. Since both of the analog cellular voice mobility controllers and the CDPD controllers such as MD-IS 73 need system control by some coordinating entity, a single programming point such as NMS 74 can be used to program and control both types of system. By connecting NMS 74 to ISCP 75 through PAD 76, coordination between a CDPD system and landline AIN can be obtained at a high level of control. A connection carried out at this level can allow programming to be carried out in coordinated fashion for all of the landline, analog cellular voice and CDPD systems. It is noted that ISCP 75 can be co-located with NMS 74. By carrying out the programming at this level, certain codes, tags or identifiers can be designated to be recognized throughout any of the analog cellular voice, landline or CDPD systems. Thus, mobile subscriber station 71 can be pre-programmed with codes that can be used in packet headers to designate certain instruction sets input by the subscriber to be transmitted through the CDPD system to an appropriate ISCP of the landline system.

A key part of such an NMS would be a well known device known as a protocol assembler/disassembler (PAD). A PAD such as 79 accepts a data stream from a CDPD element such as MD-IS 73 and reconfigures the data stream into packets of a length that can be handled by both MTSO 26 and AIN elements such as ISCP 40. A PAD also has the capability of communicating with packet networks using a packet network protocol, X.25, which is the CCITT is protocol recommendation that most public and private networks used.

A packet network uses the address field of the packet routed to various entities in both the CDPD and AIN networks. Consequently, it is necessary that the subscriber handset be provided with means for applying the correct destination data so that the packets can be sent to the proper landline destination such as an ISCP. The PAD is also used to carry out error checking routines, as well as assembling and disassembling data blocks to remove defunct header messages and reassemble the useful data into a complete message. In this process, conversion from one type of protocol (such as that used by a CCIS) as converted to another (such as that used by a CDPD system). Consequently, the capability of easily converting CDPD protocol to that used by an AIN or AMPS is well within the capability of one skilled in this art so that additional explanation regarding this technique is not necessary for purposes of this application.

The advantage of the present invention is the facilitation of a request for calling features or authorization from a wireless mobile station through the CDPD system to the ISCP of an AIN. Normally, the provision of the calling features or other authorization is carried out by using the AIN exclusively. However, it is also possible to send authorization signals from an ISCP to an SSP or an IP responsible for providing the calling features via the CDPD system. Confirmation that the calling features had been provided or that the authorization is accepted will be conveyed to the mobile subscriber station via the CDPD system in the same manner that normal data is transmitted to any CDPD mobile subscriber station.

As is well known in this art, there is a home MD-IS for each subscriber of the CDPD system in the same manner that there is a home MTSO for each subscriber in a normal cellular system. Likewise, there is a home SSP for every landline subscriber and a home ISCP controlling the activities of the home SSP. The difficulty in using the CDPD system in conjunction with the AIN rises in that in conventional systems there is no correlation between the data contained in the home SSP or ISCP for a landline subscriber and the data contained in the home and MD-IS for the same subscriber using a CDPD system. Consequently, it is necessary to provide a means by which the subscriber information normally contained in the home controllers of the respective systems can be efficiently exchanged to effect efficient routing of instruction messages when transferring from the CDPD system to the AIN and vice versa.

In the preferred embodiment of the present invention, transfer of information regarding the subscriber is facilitated between the AIN and the CDPD system by virtue of assigning numbers to the home SSP and/or home ISCP. While a subscriber number for the home MD-IS is not necessary, the identification of the home MD-IS is necessary if communication between an AIN and CDPD system takes place outside of the home of the CDPD system or the subscriber. However, techniques for locating the home MD-IS of a foreign roaming subscriber station in a CDPD system is generally beyond the scope of the present application. It is sufficient to know that there are techniques used with PCS operations such as that found in U.S. Pat. No. 5,353,331 to Emery et al. that can facilitate efficient routing to the home MD-IS of a foreign CDPD subscriber.

Figure 7:
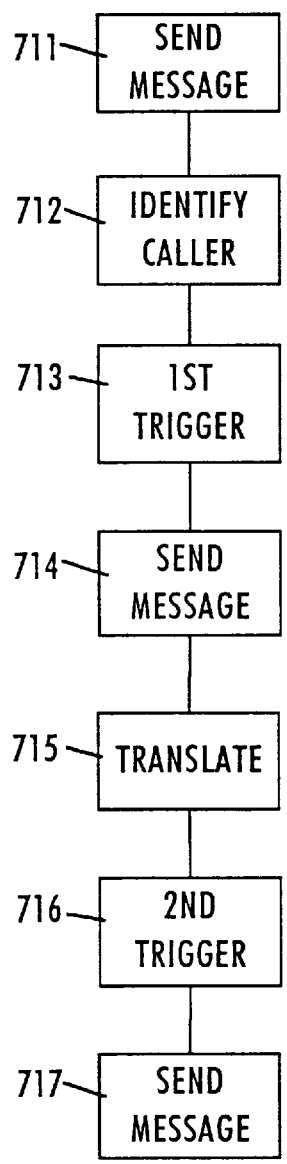
FIG. 7 is a flow diagram depicting the operation of sending a control signal from the CDPD system to a landline AIN.

In the operation of the present invention in which there is no data correlation between the home ISCP (or SSP) and home MD-IS is depicted in the flow chart of FIG. 7.

The process of FIG. 7 is best carried out using the routing depicted by label "D" in FIG. 6. However, a very similar process is used on each of the other calling routes depicted in FIG. 6. The key is that calling instructions, such as a request for authorization or calling features, is sent by a mobile subscriber over the CDPD system, and translated for handling by a landline AIN. An ISCP in the AIN will receive the instruction message and initiate the action required.

At step 711, a subscriber station such as 71 will send a message including a call destination and an instruction set. As is typical in a CDPD system, there may be a delay between sending this message and finding an appropriate channel. However, such delays from a calling mobile subscriber are quite short. It is only on the receiving end that the substantial time delays tend to occur. At the mobile data base station 72, the identity of the caller is established as indicated at step 712. This is standard with any CDPD or analog voice cellular system since the calling party must be identified accurately for billing purposes.

This information is passed from the mobile data base station to a CDPD controller such as MD-IS 73. This controller recognizes the destination number or the request for calling features number previously described, thereby triggering a first routing operation at step 713. Because of the specific trigger activated, the MD-IS is directed to send the call to a landline AIN entity such as SSP 17 or STP 25. The digits to which the trigger responds can also be used to specify which AIN entity the call is to be transferred. If only one AIN option exists (a single AIN connection to the CDPD controller), the trigger will automatically cause transfer of the call to that entity. Otherwise, further determination is necessary so that the correct AIN entity is chosen for call transfer.

Once the correct entity is chosen, whether by a determination based upon a calling code or by mere default (due to a single AIN entity connected to the MD-IS), the call message is sent from the CDPD control entity (MD-IS) to the AIN entity (either SSP or an STP). As part of the transmission step 714, the CDPD protocol from the controller is translated from CDPD protocol to a CCIS protocol used in the landline AIN. This is carried out by a PAD which can be located either at the CDPD entity or the AIN entity.

Assuming that the AIN entity is an SSP such as 17, the received call message is analyzed to determine if a CCIS trigger exists to initiate an additional control or transmission operation. The technique of triggering an SSP to cause transmission to the local ISCP are well known in the AIN art. As such, the correct configuration of digits can be included as part of the original message sent by the mobile subscriber station. This is generally part of the request for a particular calling service or authorization sequence. Once the second trigger at step 716 is effected, a call message is routed to a local ISCP such as 40. Normally such routing takes placed through an STP in a manner well known to the operation of landline advanced intelligent networks.

The aforementioned process of using predetermined subscriber numbers can be applied to the reverse channel routes labelled "A–D" and "G". It is noted that the subscriber numbers assigned to the various elements such as SSP 17 or cellular MC (MTSO) 26 do not necessarily have to be the standard seven digit coding normally used throughout this country. Instead, the number designating a particular destination can be a three digit number as is used in U.S. application Ser. No. 08/396,301 filed Feb. 28, 1995. Using that technique, it is possible to specify calling features or access a particular service provider using a three digit number in conjunction with the identity information of the calling subscriber. From this technique as applied to the present application, the three digit number would act as a trigger in the MD-IS to send the call message to the nearest AIN element as explained in conjunction with FIG. 7. However, it is also possible that the three digits could identify a particular SSP, STP for ISCP to which the data is to be routed. Further, when used in conjunction with the calling subscriber ID information, this three digit number can also be used to specify a particular calling service that is to be provided by the ISCP or an IP authorized by the ISCP. The techniques of using only a three digit number and the calling subscriber ID data to provide connection to calling features or service providers is fully discussed in U.S. Pat. No. 5,418,844 and patent application Ser. No. 08/396,301, incorporated herein by reference.

The route labelled "A" permits the transmission of the call originated by subscriber station 71 to be transferred from MD-IS 73 to cellular MC (MTSO) 26. Normally, direct links for CCIS or voice calls do not exist between CDPD controllers such as 73 and analog cellular voice controller such as 26. Consequently, it would be necessary to establish data lines between these two entities to carry the digital data originated by subscriber station 71. This could be problematical since analog cellular voice controllers and CDPD controllers are not normally co-located. As always, a PAD such as 79 is necessary to translate the protocols between the two systems. This arrangement would require that the subscriber station 71 would have to identify controller 26 as an intermediate designation for the call. This could be done as earlier described by making such identification part of a service identification entered by subscriber unit 71. This identification would trigger MD-IS 73 to route the call to cellular controller 26. The same data would be used to initiate a second trigger function in controller 26 to send the caller identification data and the caller message contained in block 95 (FIG. 4) to ISCP 40 through STP's 25 and 31.

Since there is only one ISCP with which Mobility Controller (MC) 26 can communicate, it is necessary that ISCP 40 be the home ISCP for subscriber station 71. Additional routing of the message to another ISCP would require an extra layer of identification (probably contained within message block 95) that would instruct ISCP 40 to attempt to forward the instructions to another ISCP appropriate for subscriber station 71. Such activity would require a level of intercommunication between ISCP's of different systems, and thus, administrative cooperation between the system/service providers. This does not necessarily exist in all cases. Consequently, this technique becomes problematical if ISCP 40 is not the home ISCP of subscriber station 71. Further, if the ISCP 40 is not the home ISCP for subscriber station 71, the necessary information regarding the subscriber station may not be available to the ISCP. This is critical since the scope of this invention includes requests for calling features that will be carried out at the home SSP of subscriber station 71. Consequently, all data regarding the pre-arranged calling features or authorization for such features must be available to the ISCP that is to instruct their home SSP to carry out the requested calling functions.

If authorization for a purchase or provision of some other service is being transmitted by subscribe station 71, data regarding services and authorization for purchases relevant to subscriber station 71 is also necessary. This information would normally be stored only at the home ISCP of the subscriber station. Such information would include information regarding the proper authorization platforms (such as 87) with which to communicate to verify the authorization instructions generated by subscriber station 71. While it is not impossible to carry out the functions of the present invention using route "A" where ISCP 40 is not the home ISCP for subscriber station 71, an additional level of complexity is added by virtue of additional system identifiers, and shaped information, making the operation far less efficient.

It is common practice to associate mobility controllers with a central office switch such as SSP 17. This can also be applied to CDPD controllers such as 73. In such an arrangement, the route labelled "D" can be used when MD-IS 73 detects digits indicative of a calling feature request. Once such a trigger is initiated, the call (including message section 95, including the request/authorization for calling features for other services) is transmitted from MD-IS 73 to SSP 17. As always, a PAD such as 78 is necessary to translate the protocols between the two types of systems. Once the protocol has been translated, SSP 17 is triggered by the contents of message block 95 to send the instructions to ISCP 40 as is standard with TCIS messages in advanced intelligent landline networks. The calling instructions are then analyzed by an ISCP 40 and instructions for carrying out the calling features sent back to SSP 17. Once again, this system works best if SSP 17 and ISCP 40 are the home switching entities for subscriber station 71. While the present invention does not break down if this is not true, administrative cooperation between different systems and data message transfer protocol between different systems becomes necessary.

The route labelled "C" is also particularly efficient if ISCP 40 is the home ISCP for subscriber station 71. Once the proper digits are detected in MD-IS 73, a trigger operation is carried out that will send the entire call message directly to ISCP 40 via STP's 25 and 31. As always, a PAD such as 77 is necessary to translate between the CDPD protocol and the CCIS protocol. The advantage of this routing is that an additional trigger in a home SSP such as 17 is not necessary.

As previously discussed, there is generally a lack of correlation between the home switching control entities for CDPD systems, cellular analog voice systems and AIN systems. This lack of correlation can be corrected through the use of a Network Management System (NMS) such as 74. This control system can be used to carry out control functions for a number of CDPD controllers such as 73, as well as for analog cellular voice controllers such as 26. The use of integrated control for both types of wireless systems also leads to the co-location of both types of controllers as depicted by controller 73' in FIG. 6. In such an arrangement, the call route depicted by "A" is no longer problematical. Further, any SSP serving either of the controllers can be used to carry out the routing labelled "D" in FIG. 6. Further, it is most likely that with such an arrangement that both controllers will share a common ISCP so that call routing is in the route labelled "C" becomes much more efficient.

Preferably, network management system 74 will also connect directly to at least one ISCP such as 75. As always, a protocol assembler/disassembler such as 76 is necessary to convert between the protocols of the various systems being used. By using the network management system, the necessary PAD's for all the systems can be contained within a single control entity. Preferably, the network management system will contain a kind of comprehensive data of both landline and cellular users that is included in the visitor location register and home location register as well as the ISCP's as described in U.S. Pat. No. 5,353,331 to Emery et al. (previously incorporated herein by reference). Using the identity of the calling subscriber station 71, the NMS could route calling feature requests, authorization data or purchase data to the correct destination. For example, if subscriber station 71 is requesting that certain calling features be provided for analog voice cellular operation, the network management system could identify the home cellular controller for the subscriber station and forward the instructions thereto. The network management system would also have the same capability if the subscriber station had been roaming. However, this facility is limited by the type of calling features available at the foreign mobility controller, and by administrative arrangements between the two systems that would authorize such requests by roaming subscriber stations.

Using landline AIN's and the ISCP's contained therein, the network management system could identify home ISCP's for subscriber stations such as 71, and route instructions to the proper ISCP using conventional CCIS protocol. An ISCP such as 75 could then order the provision of the requested calling features. This can be done as depicted by the route labelled "E" in FIG. 6. IP's such as 81 are often used to provide calling features to an SSP such as 17. Instructions sent from ISCP 75 would initiate the calling features without additional control burdens being placed upon the SSP such as 17. Rather, the particular numbers received by the SSP will then trigger the operation of the calling features provided by IP 81. The use of IP's is already well known in the art of advanced intelligent landline networks so that no further elaboration is needed.

If subscriber station 71 is requesting data to authorize a purchase of goods or services, a message similar to the request for calling features could be sent to ISCP 75 via network management system 74. The ISCP 75 wold distinguish between the request for calling features and the request for authorization. This distinction would trigger a message being sent to authorization platform 87. Authorization could be carried out using either the message originally sent by the subscriber station or by carrying out two way communication between the subscriber station and authorization platform 89. The communication between the authorization platform 87 and the mobile subscriber station 71 can be carried out by following the pathway labelled "B" in FIG. 6. However, subscriber station "B" may have roamed further and be outside of the area of control of the original controller 73. In such a case, the network management system 74 can carry out a search of surrounding controllers and effect contact between a new MDBS included in the CDPD data system 80 and authorization platform 87. As always, a protocol assembler/disassembler such as 88 is needed to manage the protocol differences between the various control entities.

CDPD/data system 80 can also be used to convey the instructions for calling features from an ISCP, such as 75, using the route labelled "F". Either the instructions could be routed through the network management system or directly from an ISCP to an ID-IS (route not shown). It is expected that transmission of such data would be between CDPD controllers such as 73 and 73' and would not be carried out using mobile data base station such as 72. It would also be necessary that the network management system identify the location of the relevant MD-IS so that the message could be sent through that MD-IS to the proper IP 82. The requested calling features would be provided by IP 82 to SSP 17. It is noted that this particular routing is quite complex and would require identification of both the MD-IS and the proper IP 82. Consequently it is not expected that instructions or calling features will be passed through the CDPD/data system under optimal circumstances. However, if a response or other type of data is to be sent to the originating subscriber station 71, a return path from the control entity such as ISCP 75 or NMS 74 is most efficiently created through the CDPD/data system.

Figure 4:
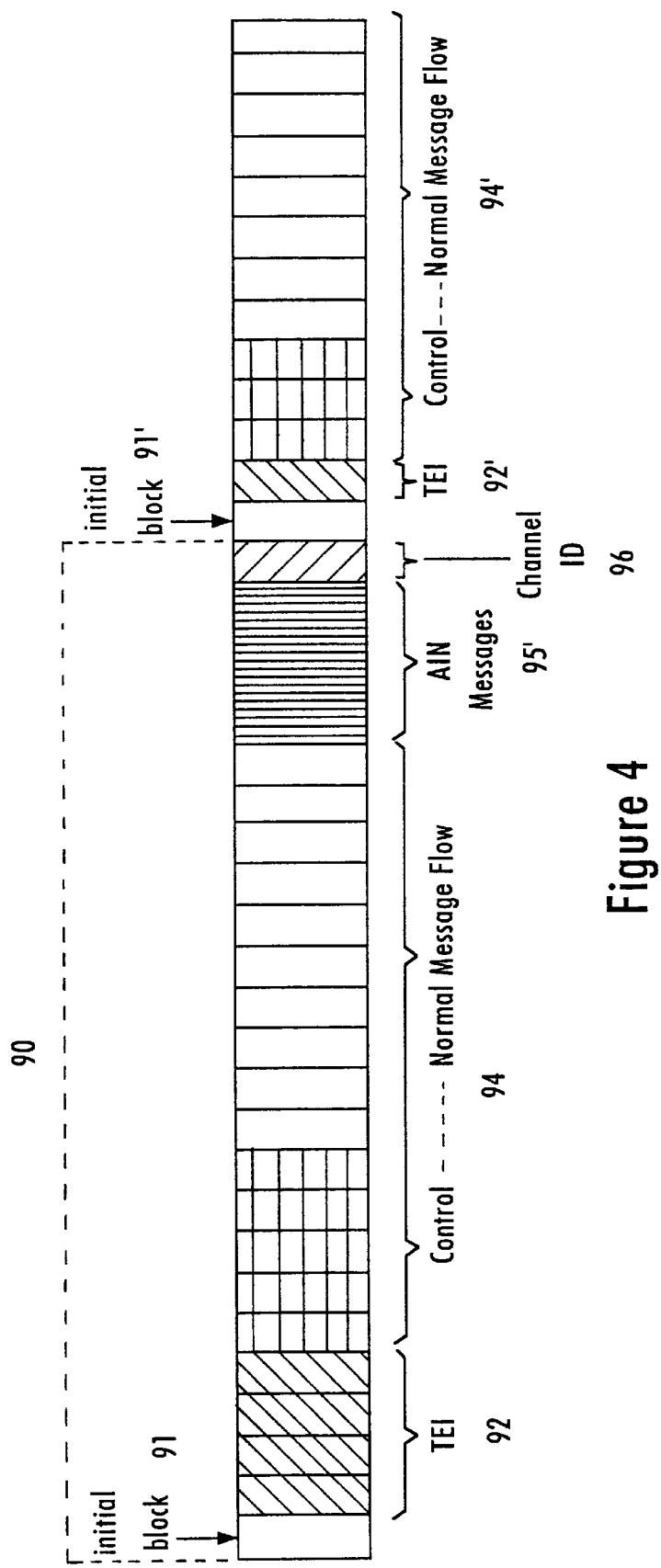
FIG. 4 is a diagram depicting CDPD data blocks.

If the CDPD system is being used to send a response or query data to originating subscriber station 71, then the message control block depicted in FIG. 4 will be the arrangement used to convey the relevant messages. It is noted that block 91 is an initial block used to indicate the beginning of an epoch 90 that is used as a standard unit of transmission in CDPD systems. This sequence is used when sending messages from the MD-IS through an MDBS to mobile subscriber stations. The block section 92 containing Temporary Equipment Identifiers (TEI) is used to identify those stations for which messages are pending. Block section 94 contains the standard message flow (generally CDPD data), as well as distributed control messages. Messages dealing with AIN data is contained in message block section 92, and carries the confirmation from the AIN that the ISCP has received and acted upon instructions. If interactive messages are necessary, additional instructions for the subscriber station will be contained in message block section 95. The end of the message block section 95 is indicated by a channel ID which also indicates the currents of the next initial block 91' for the next epoch 90.

Because CDPD communication is intermittent and depends upon gaps in analog cellular voice communication, there are often time delays between the transmission of a CDPD message and its receipt at the destination. This delay can be from a few seconds to a few minutes. Normally, this is not a problem since the request for calling its features is not particularly urgent. Also, acknowledgement and instructions that have been received can also be carried out in a leisurely manner. However, if two-way communication between the subscriber station such as 71 and an authorization platform such as 87 is necessary to transact business or obtain authorization, the normal CDPD arrangement becomes quite awkward. Consequently, if a great deal of two-way communication will be carried out on the CDPD channels, it may be necessary to dedicate one channel exclusively for CDPD use. In this way, the normal time delays will not intrude upon two-way communication. In all other uses of the CDPD system encompassed by the present invention, there is no substantial difference between a dedicated CDPD channel and the use of CDPD on non-dedicated channels other than the aforementioned time delay.

We claim:

1. A combined landline and wireless communication system comprising:
   (a) a landline Advanced Intelligent Network (AIN) system including switching entities, a control entity and a Common Channel Interoffice Signalling (CCIS) system connecting said switching entities and said control entity;
   (b) a Cellular Digital Packet Data (CDPD) system arranged for communication with wireless subscriber units, and having a plurality of Mobile Data Base Stations (MDBS) and at least one CDPD controller; and
   (c) an interface between said AIN system and said CDPD system for enabling communication of service control information from one of the wireless subscriber units to the AIN control entity.

2. The system of claim 1, wherein said AIN control entity comprises an Integrated Service Control Point.

3. The system of claim 2, wherein said at least one CDPD controller comprises a Mobile Data Intermediate system.

4. The system of claim 3, further comprising an analog voice cellular telephone system arranged for communication with wireless subscriber stations, said analog voice cellular telephone system comprising a plurality of base stations and at least one Mobility Controller (MC).

5. The system of claim 1, further comprising means for translating the service control information from CDPD protocol to a landline data protocol.

6. The system of claim 5, wherein the landline data protocol comprises a common channel interoffice signaling (CCIS) protocol.

7. A combined landline and wireless communication system comprising:
   (a) a landline Advanced Intelligent Network (AIN) including switching entities and control entities and a Common Channel Interoffice Signalling (CCIS) system connecting said switching and control entities, wherein the AIN control entities comprise Integrated Service Control Points (ISCPs);
   (b) a Cellular Digital Packet Data (CDPD) system arranged for communication with wireless subscriber units, and having a plurality of Mobile Data Base Stations (MDBS) and a CDPD controller, wherein the CDPD controller comprises a Mobile Data Intermediate System (MD-IS);
   (c) an interface between said AIN system and said CDPD system;
   (d) means for translating between CDPD protocol and CCIS protocol; and
   (e) an analog voice cellular telephone system arranged for communication with wireless subscriber stations, said analog voice cellular telephone system comprising a plurality of base stations and at least one Mobility Controller (MC), wherein at least one MDBS is co-located with at least one cellular telephone base station.

8. A combined landline and wireless communication system comprising:
   (a) a landline Advanced Intelligent Network (AIN) including switching entities and control entities and a Common Channel Interoffice Signalling (CCIS) system connecting said switching and control entities, wherein the AIN control entities comprise Integrated Service Control Points (ISCPs);
   (b) a Cellular Digital Packet Data (CDPD) system arranged for communication with wireless subscriber units, and having a plurality of Mobile Data Base Stations (MDBS) and a plurality of CDPD controllers, wherein each of the CDPD controllers comprises a Mobile Data Intermediate System (MD-IS);
   (c) an interface between said AIN system and said CDPD system;
   (d) means for translating between CDPD protocol and CCIS protocol; and
   (e) a Network Management System (NMS) operatively connected to the MD-IS's to provide operating instructions and control for said CDPD system.

9. The system of claim 8, wherein said NMS is operatively connected to at least one ISCP and arranged to convey control messages between said landline AIN and said CDPD system.

10. The system of claim 9, wherein said NMS comprises the means for translating between CDPD protocol and CCIS protocol.

11. The system of claim 10, wherein at least one MC is co-located with at least one MD-IS.

12. A combined landline and wireless communication system comprising:
   (a) a landline Advanced Intelligent Network (AIN) including switching entities and control entities and a Common Channel Interoffice Signalling (CCIS) system connecting said switching and control entities, wherein the AIN control entities comprise Integrated Service Control Points (ISCPs);
   (b) a Cellular Digital Packet Data (CDPD) system arranged for communication with wireless subscriber units, and having a plurality of Mobile Data Base Stations (MDBS) and a CDPD controller, wherein the CDPD controller comprises a Mobile Data Intermediate System (MD-IS);
   (c) an interface between said AIN system and said CDPD system, wherein said interface is operatively connected between the MD-IS and a Service Switching Point (SSP) constituting a switching entity in said AIN, and
   (d) means for translating between CDPD protocol and CCIS protocol.

13. A method of providing control signals to an Integrated Service Control Point (ISCP) in a landline Advanced Intelligent Network (AIN), said method comprises steps of:
   (a) generating at a wireless subscriber station a call message including said control signals;
   (b) transmitting said call message over a Cellular Digital Packet Data (CDPD) system from said wireless subscriber station to a Mobile Data Base Station (MDBS) dedicated to CDPD operation;
   (c) transmitting said call message from said MDBS to a CDPD control entity;
   (d) identifying a portion of said call message to trigger transmission from said CDPD control entity to an AIN entity;
   (e) translating between CDPD protocol and Common Channel Interoffice Signalling (CCIS) protocol; and
   (f) identifying a second portion of said call message to trigger the transmission to said ISCP via CCIS data lines.

14. The method of claim 13, wherein step (c) comprises the sub-step of identifying said calling subscriber station.

15. The method of claim 14, wherein step (f) further comprises the sub-step of transmitting said call message from a Signal Switching Point (SSP) to said ISCP via a Service Transfer Point (STP).

16. The method of claim 13, further comprising:
   (g) sending control signals from said ISCP to activate calling features corresponding to contents of said call message.

17. A control system for a combined network, said combined network including a landline Advanced Intelligent Network (AIN), an analog cellular voice communication system and a Cellular Digital Packet Data (CDPD) system, said control system comprising:
   (a) a Common Channel Interoffice Signalling (CCIS) system arranged to communicate between switching entities and a control entity in said AIN; and
   (b) a CDPD Network Management System (NMS) arranged to provide operating instructions to said CDPD system, and comprising:
      (i) an interface with said AIN system for communicating with the control entity of the AIN system,
      (ii) an interface with said analog cellular voice system,
      (iii) protocol translation means for translating between protocols of said AIN system, said CDPD system and said analog voice cellular system, and
      (iv) means for generating instructions for said CDPD system, said AIN system and said analog cellular voice system.

* * * * *